United States Patent
Zhang

(10) Patent No.: US 9,912,859 B2
(45) Date of Patent: Mar. 6, 2018

(54) FOCUSING CONTROL DEVICE, IMAGING DEVICE, FOCUSING CONTROL METHOD, AND FOCUSING CONTROL PROGRAM

(71) Applicant: FUJIFILM Corporation, Tokyo (JP)

(72) Inventor: Yitong Zhang, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/629,828

(22) Filed: Jun. 22, 2017

(65) Prior Publication Data
US 2017/0289441 A1 Oct. 5, 2017

Related U.S. Application Data

(63) Continuation of application No. PCT/JP2015/081896, filed on Nov. 12, 2015.

(30) Foreign Application Priority Data

Dec. 26, 2014 (JP) .................. 2014-265823

(51) Int. Cl.
*H04N 5/228* (2006.01)
*H04N 5/232* (2006.01)
(Continued)

(52) U.S. Cl.
CPC ......... *H04N 5/23212* (2013.01); *G03B 13/36* (2013.01); *G06K 9/00255* (2013.01);
(Continued)

(58) Field of Classification Search
CPC ........... H04N 5/23212; H04N 5/23219; H04N 5/23293; G06K 9/6202; G06K 9/00255; G06K 9/00604; G03B 13/36
See application file for complete search history.

(56) References Cited

U.S. PATENT DOCUMENTS

2007/0064145 A1 3/2007 Sugimoto
2008/0284901 A1* 11/2008 Misawa .................. G02B 7/36
348/349
(Continued)

FOREIGN PATENT DOCUMENTS

JP 2007-34261 A 2/2007
JP 2012-198807 A 10/2012
(Continued)

OTHER PUBLICATIONS

International Search Report, issued in PCT/JP2015/081896 (PCT/ISA/210), dated Feb. 16, 2016.
(Continued)

*Primary Examiner* — Chia-Wei A Chen
*Assistant Examiner* — John H Morehead, III
(74) *Attorney, Agent, or Firm* — Birch, Stewart, Kolasch & Birch, LLP

(57) ABSTRACT

Disclosed are a focusing control device, an imaging device, a focusing control method, and a focusing control program capable of enabling focusing on an eye region and obtaining an intended focusing result. The focusing control device includes a focusing position determination unit 34 which determines a focusing position based on a captured image signal obtained by imaging a subject with an imaging element 5 while moving a focus lens, and an AF region determination unit 33 which determines an AF region based on a face region detected from a captured image signal obtained through imaging with the imaging element 5 at an arbitrary time and an eye region detected from a captured image signal obtained through imaging at a time before the arbitrary time. The focus lens is driven to the focusing position determined by the focusing position determination unit 34 based on a signal of the AF region.

18 Claims, 10 Drawing Sheets

(51) Int. Cl.
*G06K 9/00* (2006.01)
*G06K 9/62* (2006.01)
*G03B 13/36* (2006.01)

(52) U.S. Cl.
CPC ....... *G06K 9/00604* (2013.01); *G06K 9/6202* (2013.01); *H04N 5/23219* (2013.01); *H04N 5/23293* (2013.01)

(56) References Cited

U.S. PATENT DOCUMENTS

| | | | | |
|---|---|---|---|---|
| 2010/0220892 | A1* | 9/2010 | Kawakubo | A61B 3/14 382/103 |
| 2012/0081560 | A1* | 4/2012 | Park | H04N 5/23219 348/208.12 |
| 2012/0147252 | A1* | 6/2012 | Kunishige | H04N 5/23212 348/345 |
| 2013/0265484 | A1 | 10/2013 | Hasegawa | |
| 2014/0104483 | A1* | 4/2014 | Kunishige | H04N 5/23212 348/349 |
| 2014/0112535 | A1* | 4/2014 | Chen | G06K 9/00382 382/103 |
| 2014/0125863 | A1* | 5/2014 | Toyoda | H04N 5/2355 348/362 |
| 2015/0163440 | A1* | 6/2015 | Furumochi | H04N 9/735 348/223.1 |
| 2015/0201123 | A1 | 7/2015 | Koguchi et al. | |

FOREIGN PATENT DOCUMENTS

| | | |
|---|---|---|
| JP | 2012-199986 A | 10/2012 |
| JP | 2012-231200 A | 11/2012 |
| JP | 2013-80246 A | 5/2013 |
| JP | 2013-216177 A | 10/2013 |
| WO | WO 2014/046036 A1 | 3/2014 |

OTHER PUBLICATIONS

Written Opinion of the International Searching Authority, issued in PCT/JP2015/081896 (PCT/ISA/237), dated Feb. 16, 2016.

* cited by examiner

FOCUSING CONTROL DEVICE, IMAGING DEVICE, FOCUSING CONTROL METHOD, AND FOCUSING CONTROL PROGRAM

CROSS REFERENCE TO RELATED APPLICATION

This is a continuation of International Application No. PCT/JP2015/081896 filed on Nov. 12, 2015, and claims priority from Japanese Patent Application No. 2014-265823 filed on Dec. 26, 2014, the entire disclosures of which are incorporated herein by reference.

BACKGROUND OF THE INVENTION

1. Field of the Invention

The present invention relates to a focusing control device, an imaging device, a focusing control method, and a computer readable medium storing a focusing control program.

2. Description of the Related Art

In recent years, with an increase in resolution of imaging elements, such as a charge coupled device (CCD) image sensor and a complementary metal oxide semiconductor (CMOS) image sensor, there is a rapid increase in demand for information devices having an imaging function, such as a digital still camera, a digital video camera, and a smartphone. The information devices having an imaging function described above are referred to as imaging devices.

In these imaging devices, as a focusing control method which focuses on a main subject, a contrast auto focus (AF) method or a phase difference AF method is employed.

The contrast AF method is a method which acquires contrast of a captured image signal obtained in each drive stage while driving a focus lens in an optical axis direction as an evaluation value and determines a lens position having the highest evaluation value as a focusing position. The focus lens used herein is a lens which moves in the optical axis direction to adjust a focal length of an imaging optical system.

There are various methods which sets a specific region (hereinafter referred to as an AF region) indicating a region to be focused in a captured image signal. For example, an imaging device described in JP2013-80248A extracts a face and an eye of a person from a captured image signal captured with an imaging element, further specifies the direction of the face, in a case where the face is directed toward the front, sets the face as an AF region, and in a case where the face is directed toward a side, sets the eye as an AF region.

An imaging device described in JP2012-231200A detects a face from a subject based on a captured image signal, further detects organs in the face, such as eyes, a nose, a mouth, corners of the mouth, and pupils, and sets the detected eye as an AF region.

An imaging device described in JP2012-199986A extracts candidate groups of eyes, a nose, a mouth, and ears of a subject from a captured image signal, and determines a pair of candidates satisfying conditions from among the extracted candidate groups of the eyes as a pair of eyes. Then, a face region is detected by associating the candidate group of the eyes with other parts forming a face corresponding to the candidate group of the eyes, and the detected face region is set as an AF region.

An imaging device described in JP2012-198807A detects a face region of a subject from each of a plurality of captured image signals, and further detects an organ, such as eyes, a mouth, or a nose, from the detected face region. Then, according to a method described in this document, the moving position of the face region is followed on a plurality of captured image signals and a region with the position of at least one organ on the captured image signal corrected is set as an AF region.

SUMMARY OF THE INVENTION

In recent imaging devices, there is an increasing user's demand for not only bringing a face region into focus but also bringing an eye region into focus. Furthermore, in the recent imaging devices, it is desirable to reduce the time until a subject is brought into focus.

Processing for detecting an eye region from a captured image signal is complicated compared to processing for detecting a face region from a captured image signal, and a lot of time is required for processing. For this reason, it is difficult to detect a face region and an eye region simultaneously from a captured image signal obtained at an arbitrary timing.

Accordingly, if an eye region is brought into focus, an evaluation value is calculated for the detected eye region after waiting until the detection processing of the eye region ends. However, in a case where a subject is moving, there is a possibility that deviation occurs between the detected eye region and the position of the eye region at the present time, and there is a possibility that an intended focusing result is not obtained.

In JP2013-80248A, JP2012-231200A, JP2012-199986A, and JP2012-198807A, such a problem in that it is difficult to detect a face region and an eye region at the same timing is not taken into consideration.

The invention has been accomplished in consideration of the above-described situation, and an object of the invention is to provide a focusing control device, an imaging device, a focusing control method, and a computer readable medium storing a focusing control program capable of enabling focusing on an eye region and obtaining an intended focusing result.

A focusing control device of the invention comprises a focusing position determination unit which causes an imaging element imaging a subject through a focus lens to image the subject for each position of the focus lens while moving the focus lens movable in an optical axis direction and determines a focusing position of the focus lens based on a captured image signal obtained through the imaging, a face detection unit which performs face detection processing on the captured image signal obtained by imaging the subject with the imaging element, an eye detection unit which performs eye detection processing on the captured image signal obtained by imaging the subject with the imaging element, a specific region determination unit which, based on a face region detected by the face detection unit from a first captured image signal obtained through imaging with the imaging element at an arbitrary time and an eye region detected by the eye detection unit from a second captured image signal obtained through imaging with the imaging element at a time before the arbitrary time, determines a specific region indicating a region to be focused in the captured image signal, and a drive unit which drives the focus lens to a focusing position determined by the focusing position determination unit based on a signal of the specific region determined by the specific region determination unit in the captured image signal.

An imaging device of the invention comprises the focusing control device and the imaging element.

A focusing control method of the invention comprises a focusing position determination step of causing an imaging element imaging a subject through a focus lens to image the subject for each position of the focus lens while moving the focus lens movable in an optical axis direction and determining a focusing position of the focus lens based on a captured image signal obtained through the imaging, a face detection step of performing face detection processing on the captured image signal obtained by imaging the subject with the imaging element, an eye detection step of performing eye detection processing on the captured image signal obtained by imaging the subject with the imaging element, a specific region determination step of, based on a face region detected in the face detection step from a first captured image signal obtained through imaging with the imaging element at an arbitrary time and an eye region detected in the eye detection step from a second captured image signal obtained through imaging with the imaging element at a time before the arbitrary time, determining a specific region indicating a region to be focused in the captured image signal, and a drive step of driving the focus lens to a focusing position determined in the focusing position determination step based on a signal of the specific region determined in the specific region determination step in the captured image signal.

A focusing control program of the invention causes a computer to execute a focusing position determination step of causing an imaging element imaging a subject through a focus lens to image the subject for each position of the focus lens while moving the focus lens movable in an optical axis direction and determining a focusing position of the focus lens based on a captured image signal obtained through the imaging, a face detection step of performing face detection processing on the captured image signal obtained by imaging the subject with the imaging element, an eye detection step of performing eye detection processing on the captured image signal obtained by imaging the subject with the imaging element, a specific region determination step of, based on a face region detected in the face detection step from a first captured image signal obtained through imaging with the imaging element at an arbitrary time and an eye region detected in the eye detection step from a second captured image signal obtained through imaging with the imaging element at a time before the arbitrary time, determining a specific region indicating a region to be focused in the captured image signal, and a drive step of driving the focus lens to a focusing position determined in the focusing position determination step based on a signal of the specific region determined in the specific region determination step in the captured image signal.

According to the invention, it is possible to provide a focusing control device, an imaging device, a focusing control method, and a focusing control program capable of enabling focusing on an eye region and obtaining an intended focusing result.

EXPLANATION OF REFERENCES

Figure 1:
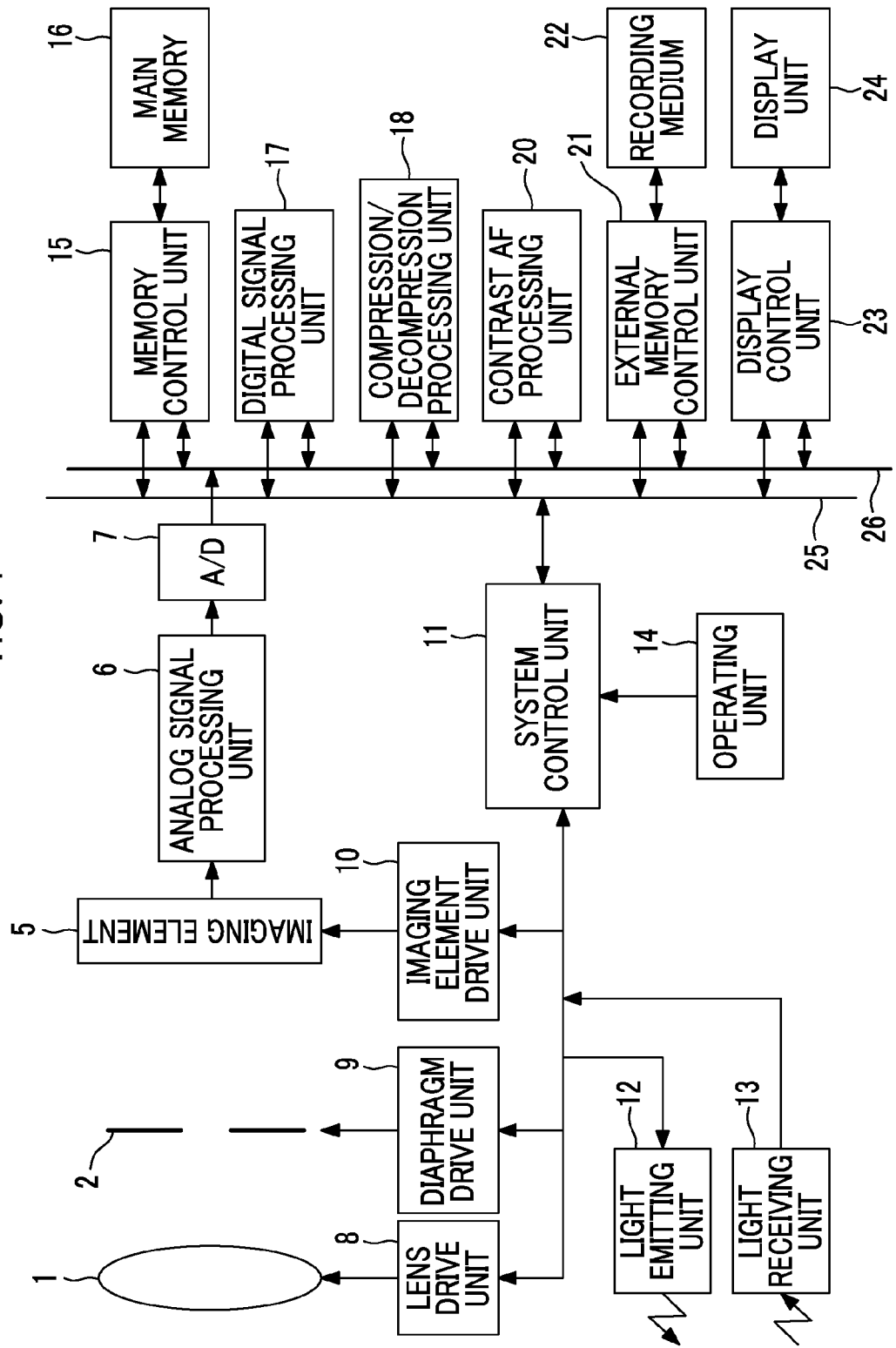
FIG. 1 is a diagram showing the schematic configuration of a digital camera as an example of an imaging device according to an embodiment of the invention.

1: imaging lens (including focus lens)
5: imaging element
11: system control unit (drive unit)
20: contrast AF processing unit
31: face detection unit
32: eye detection unit
33: AF region determination unit (specific region determination unit)
34: focusing position determination unit

DESCRIPTION OF THE PREFERRED EMBODIMENTS

Hereinafter, an embodiment of the invention will be described referring to the drawings.

FIG. 1 is a diagram showing the schematic configuration of a digital camera as an example of an imaging device according to an embodiment of the invention.

An imaging system of the digital camera shown in FIG. 1 includes an imaging optical system (including an imaging lens 1 and a diaphragm 2), and an imaging element 5, such as a CCD type or a CMOS type. The imaging optical system including the imaging lens 1 and the diaphragm 2 is detachably mounted in or fixed into a camera body. The imaging lens 1 includes a focus lens which is movable in an optical axis direction.

A system control unit 11 which integrally controls an entire electric control system of the digital camera controls a light emitting unit 12 and a light receiving unit 13. The system control unit 11 controls a lens drive unit 8 to adjust the position of the focus lens included in the imaging lens 1. In addition, the system control unit 11 adjusts the amount of exposure by controlling the amount of aperture of the diaphragm 2 through a diaphragm drive unit 9.

The system control unit 11 drives the imaging element 5 through an imaging element drive unit 10 and outputs a subject image captured through the imaging lens 1 as a captured image signal. An instruction signal from a user is input to the system control unit 11 through an operating unit 14. The captured image signal is constituted of a plurality of pixel signals arranged in a two-dimensional manner in an X direction and in a Y direction orthogonal to the X direction.

The electric control system of the digital camera further includes an analog signal processing unit 6 which is connected to an output of the imaging element 5 and performs analog signal processing, such as correlated double sampling processing, and an analog-to-digital conversion circuit (A/D) 7 which converts an analog signal output from the analog signal processing unit 6 to a digital signal. The analog signal processing unit 6 and the analog-to-digital conversion circuit 7 are controlled by the system control unit 11.

The electric control system of the digital camera further includes a main memory 16, a memory control unit 15 which is connected to the main memory 16, a digital signal processing unit 17 which performs interpolation calculation, gamma correction calculation, RGB-YC conversion processing, and the like on the captured image signal output from the analog-to-digital conversion circuit 7 to generate captured image data, a compression/decompression processing unit 18 which compresses captured image data generated by the digital signal processing unit 17 in a Joint Photographic Experts Group (JPEG) format or decompresses compressed image data, a contrast AF processing unit 20, an external memory control unit 21 to which a detachable recording medium 22 is connected, and a display control unit 23 to which a display unit 24 mounted on a camera rear surface or the like is connected.

The memory control unit 15, the digital signal processing unit 17, the compression/decompression processing unit 18, the contrast AF processing unit 20, the external memory control unit 21, and the display control unit 23 are connected to one another by a control bus 25 and a data bus 26 and are controlled according to commands from the system control unit 11.

Figure 2:
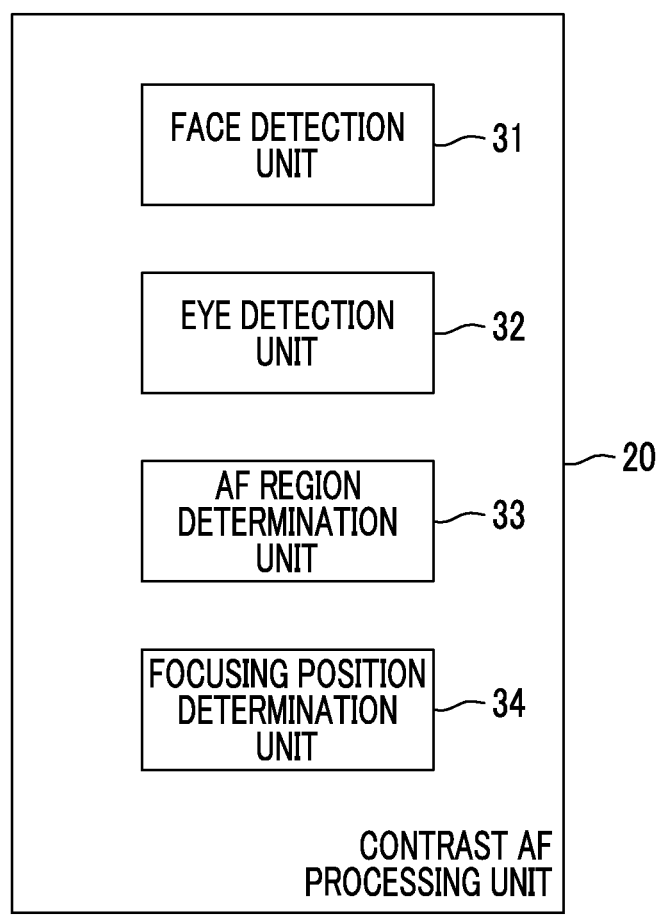
FIG. 2 is a functional block diagram of a contrast AF processing unit 20 in the digital camera shown in FIG. 1.

FIG. 2 is a functional block diagram of the contrast AF processing unit 20 in the digital camera shown in FIG. 1.

The contrast AF processing unit 20 includes a face detection unit 31, an eye detection unit 32, an AF region determination unit 33, and a focusing position determination unit 34. These functional blocks are formed by a focusing control program being executed by a processor included in the system control unit 11.

The face detection unit 31 performs known face detection processing on the captured image signal output from the imaging element 5 and digital-converted by the analog-to-digital conversion circuit 7 to detect a face of a person or an animal. As a detection method of a face, a method which detects a face using a dictionary with a plurality of kinds of face image information registered therein, a method which detects a face using template matching, or the like is applicable.

If it is detected that a face is present, the face detection unit 31 outputs, as a face detection result, the coordinates of a region (hereinafter, referred to as a face region) in the captured image signal where a face is present. The face detection unit 31 also outputs, as a face detection result, information of the direction of the face indicating whether the detected face region is a face directed toward the front with respect to the digital camera or a face directed inclined with respect to the digital camera.

The eye detection unit 32 performs known eye detection processing on a captured image signal of the face region detected by the face detection unit 31 to detect eyes of a person or an animal. If it is determined that an eye is present, the eye detection unit 32 sets, as an eye region, a predetermined region (for example, a region of about 10% of the area of the face region including eye coordinates) centering on the eye coordinates (the coordinates of one point) in the captured image signal where an eye is present and outputs the coordinates of the eye region as an eye detection result.

In a case where a face of a person or an animal is directed toward the front with respect to the digital camera, two eye regions corresponding to the right and left eyes are detected by the eye detection unit 32. Detection of whether or not a face is directed toward the front with respect to the digital camera can be performed by the face detection unit 31. In a case where the face region detected by the face detection unit 31 is a region indicating a face directed toward the front with respect to the digital camera, the eye detection unit 32 outputs either of the two eye regions detected from the face region as an eye detection result.

Even in a case where a face of a person or an animal is inclined with respect to the digital camera, two eye regions corresponding to the right and left eyes are detected by the eye detection unit 32. In this case, the eye detection unit 32 determines which of the eye regions of the two right and left eyes included in the face region is output as an eye detection result according to the position of the face region to be an eye detection target in the captured image signal.

When viewed from the digital camera, a person on the left side from the center of the angle of view of the digital camera tends to direct the entire body toward the center of the angle of view such that the right half body is reflected to the front. When viewed from the digital camera, a person on the right side from the center of the angle of view of the digital camera tends to direct the entire body toward the center of the angle of view such that the left half body is reflected to the front.

Figure 3A:
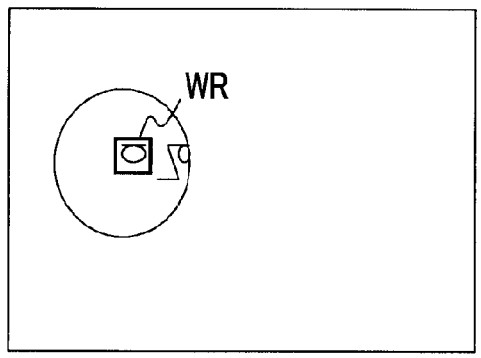
FIGS. 3A and 3B are diagrams showing an example of extraction of an eye region.

That is, as shown in FIG. 3A, if a face of a person is on the left side from the center of the captured image signal, out of two eye regions detected from the face, an eye region WR on the further left side becomes a region indicating an eye at a position closer to the digital camera.

Figure 3B:
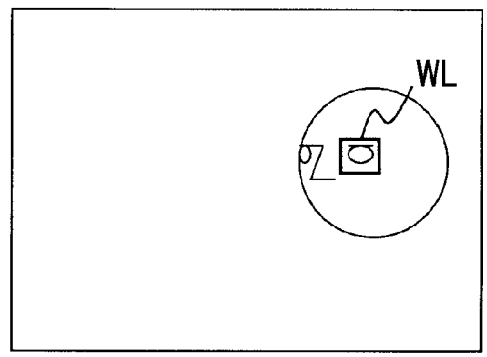

As shown in FIG. 3B, if a face of a person is on the right side from the center of the captured image signal, out of two eye regions detected from the face, an eye region WL on the further right side becomes a region indicating an eye at a position closer to the digital camera.

In a case of bringing an eye into focus, an eye at a position close to the digital camera is brought into focus, whereby it is possible to obtain a captured image without a sense of discomfort. For this reason, for a face region indicating an inclined face, the eye detection unit 32 outputs an eye region of an eye at a position closer to the digital camera as an eye detection result based on a position on the captured image signal of the face region.

The focusing position determination unit 34 causes the imaging element 5 to image a subject for each position of the focus lens while moving the focus lens included in the imaging lens 1 in the optical axis direction, and determines a focusing position of the focus lens based on a captured image signal obtained through the imaging.

Specifically, the focusing position determination unit 34 calculates a contrast value of a predetermined region of the captured image signal obtained for each moving position of the focus lens as an evaluation value. The evaluation value is obtained, for example, by integrating the difference in brightness between each pixel signal and an adjacent pixel signal in the predetermined region.

Then, the focusing position determination unit 34 calculates an evaluation value curve indicating the relationship between a plurality of calculated evaluation value and information of the focus lens position corresponding to each of a plurality of evaluation values, and determines, as the focusing position, the position of the focus lens where the evaluation value becomes maximum in the evaluation value curve.

If there is an instruction (hereinafter, referred to as an AF instruction) of contrast AF at an arbitrary time, the AF region determination unit 33 determines an AF region, which is a specific region indicating a region to be focused in the captured image signal output from the imaging element 5, based on a face region detected by the face detection unit 31 from a first captured image signal obtained through imaging with the imaging element 5 at the arbitrary time and an eye region detected by the eye detection unit 32 from a second captured image signal obtained through imaging with the imaging element 5 at a time before the arbitrary time. The AF region determination unit 33 functions as a specific region determination unit.

Figure 4:
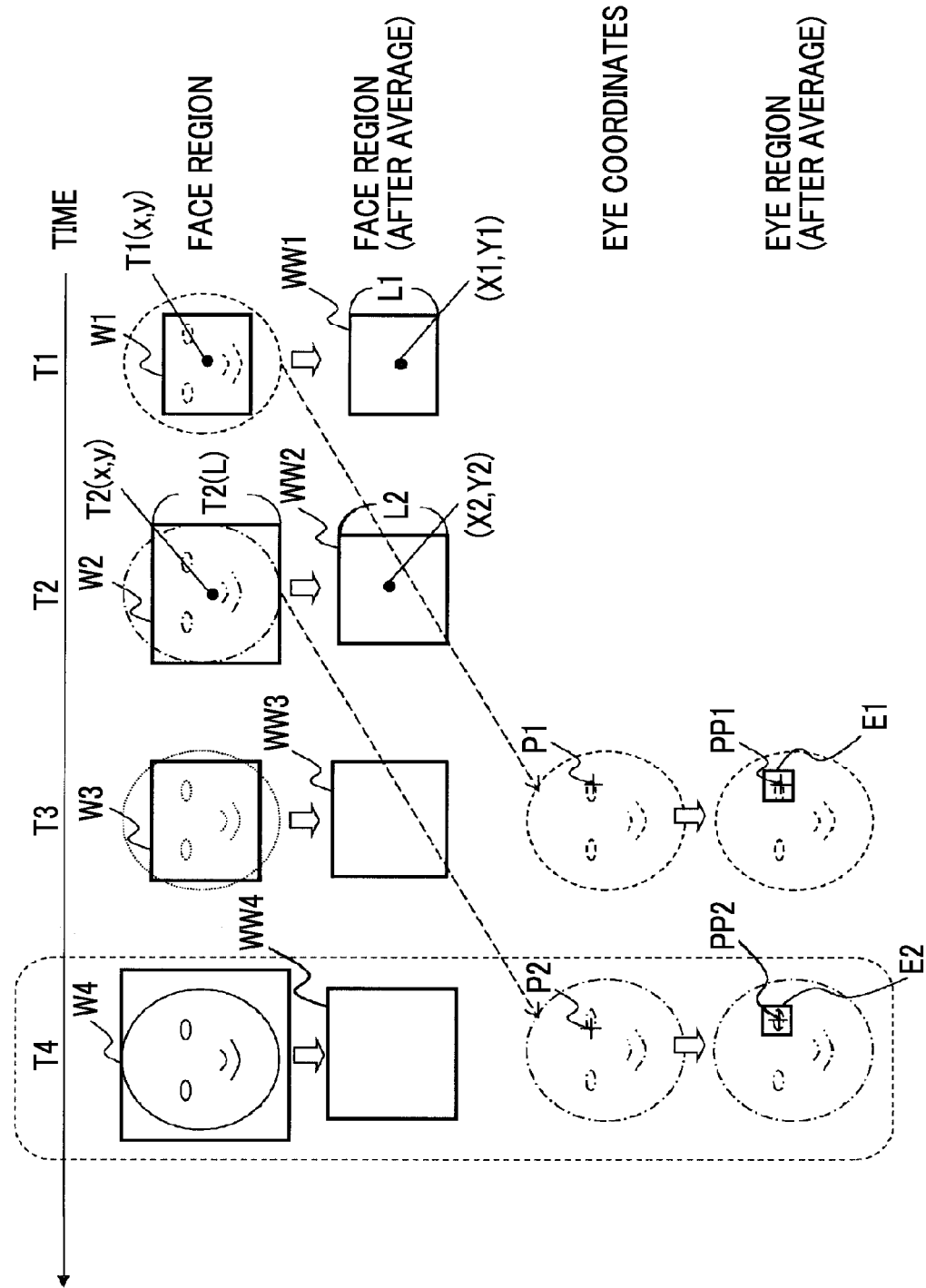
FIG. 4 is a diagram showing a face region detected by a face detection unit 31 and an eye region detected by an eye detection unit 32 in time series.

FIG. 4 is a diagram showing face regions detected by the face detection unit 31 and eye regions detected by the eye detection unit 32 in time series.

As shown in FIG. 4, at times T1 to T4, square face regions W1 to W4 are detected by the face detection unit 31. Here, in order to perform contrast AF with high accuracy, the face detection unit 31 averages the face region W1 and a face region detected before the time T1 to obtain a face region WW1.

Similarly, the face detection unit 31 averages the face region W2 and the face region WW1 obtained at the time T1 to obtain a face region WW2. The face detection unit 31 averages the face region W3 and the face region WW2 obtained at the time T2 to obtain a face region WW3. The face detection unit 31 averages the face region W4 and the face region WW3 obtained at the time T3 to obtain a face region WW4.

For example, the center coordinates (X2,Y2) of the averaged face region WW2 and the length L2 of one side of the face region WW2 are calculated by Expression (1) described below using the center coordinates T2(x,y) of the face region W2 and the length T2(L) of one side of the face region W2, and the center coordinates (X1,Y1) of the face region WW1 obtained at the time T1 and the length L1 of one side of the face region WW1.

$$X2=(T2(x)+X1)/2$$

$$Y2=(T2(y)+Y1)/2$$

$$L2=(T2(L)+L1)/2 \quad (1)$$

An eye detection processing result of the eye detection unit 32 on the captured image signal in the face region WW1 performed at the time T1 and an eye detection processing result of the eye detection unit 32 on the captured image signal in the face region WW2 performed at the time T2 are respectively output at the time T3 and the time T4 since it takes time for detection compared to a face detection processing result.

An eye region E1 output from the eye detection unit 32 at the time T3 becomes an eye region obtained by averaging an eye region including eye coordinates P1 detected from the face region W1 and an eye region output at the time T2. The center coordinates of the eye region E1 become eye coordinates PP1 output from the eye detection unit 32 at the time T3.

Similarly, an eye region E2 output from the eye detection unit 32 at the time T4 becomes an eye region obtained by averaging an eye region including eye coordinates P2 detected from the face region W2 and the eye region E1 output at the time T3. The center coordinates of the eye region E2 become eye coordinates PP2 output from the eye detection unit 32 at the time T4.

As illustrated in the face regions W1 to W4, the size of the face region detected by the face detection unit 31 varies even in the same subject. For this reason, variation in the size of the face region is minimized by average, whereby it is possible to improve the determination accuracy of the AF region.

Even for the eye region, in a case of determining the size of the eye region with respect to the size of the face region, the size of the eye region is likely to vary with variation of the face region even in the same subject. For this reason, it is effective to perform average processing. The average processing of each of the face region and the eye region is not essential.

In the example of FIG. 4, if an AF instruction is issued by a user at the time T4, the AF region determination unit 33 determines the AF region based on the face region WW4 detected at the time T4 and the eye region E2 output at the time T4.

Figure 5:
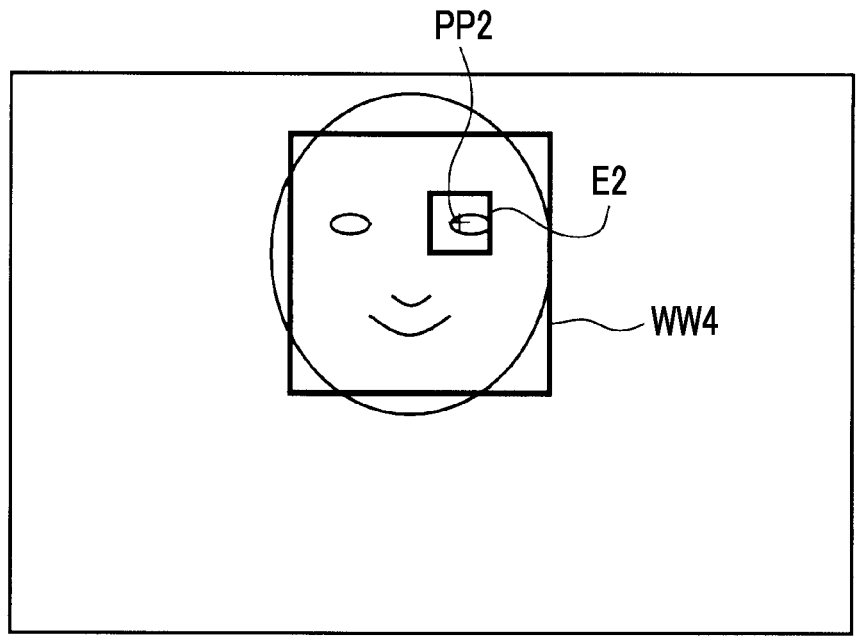
FIG. 5 is a diagram illustrating a method of determining an AF region.

For example, as shown in FIG. 5, in a case where the center coordinates PP2 of the eye region E2 output at the time T4 are present in the face region WW4 detected at the time T4, the AF region determination unit 33 determines either of the face region WW4 or the eye region E2 as the AF region.

Figure 6:
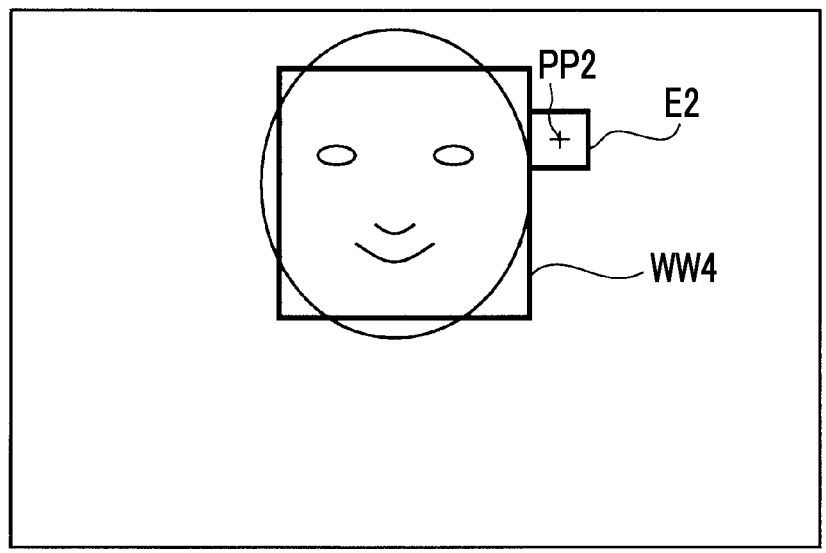
FIG. 6 is another diagram illustrating a method of determining an AF region.

As shown in FIG. 6, in a case where the center coordinates PP2 of the eye region E2 output at the time T4 are present outside the face region WW4 detected at the time T4, the AF region determination unit 33 determines the face region WW4 as the AF region. In such a case, the subject moves largely between the time T2 and the time T4, since it is possible to determine that the detection accuracy of the eye region E2 is low (there is a high possibility that a background or the like, not an actual eye, is set as the eye region E2), the face region WW4 is determined as the AF region.

Figure 7:
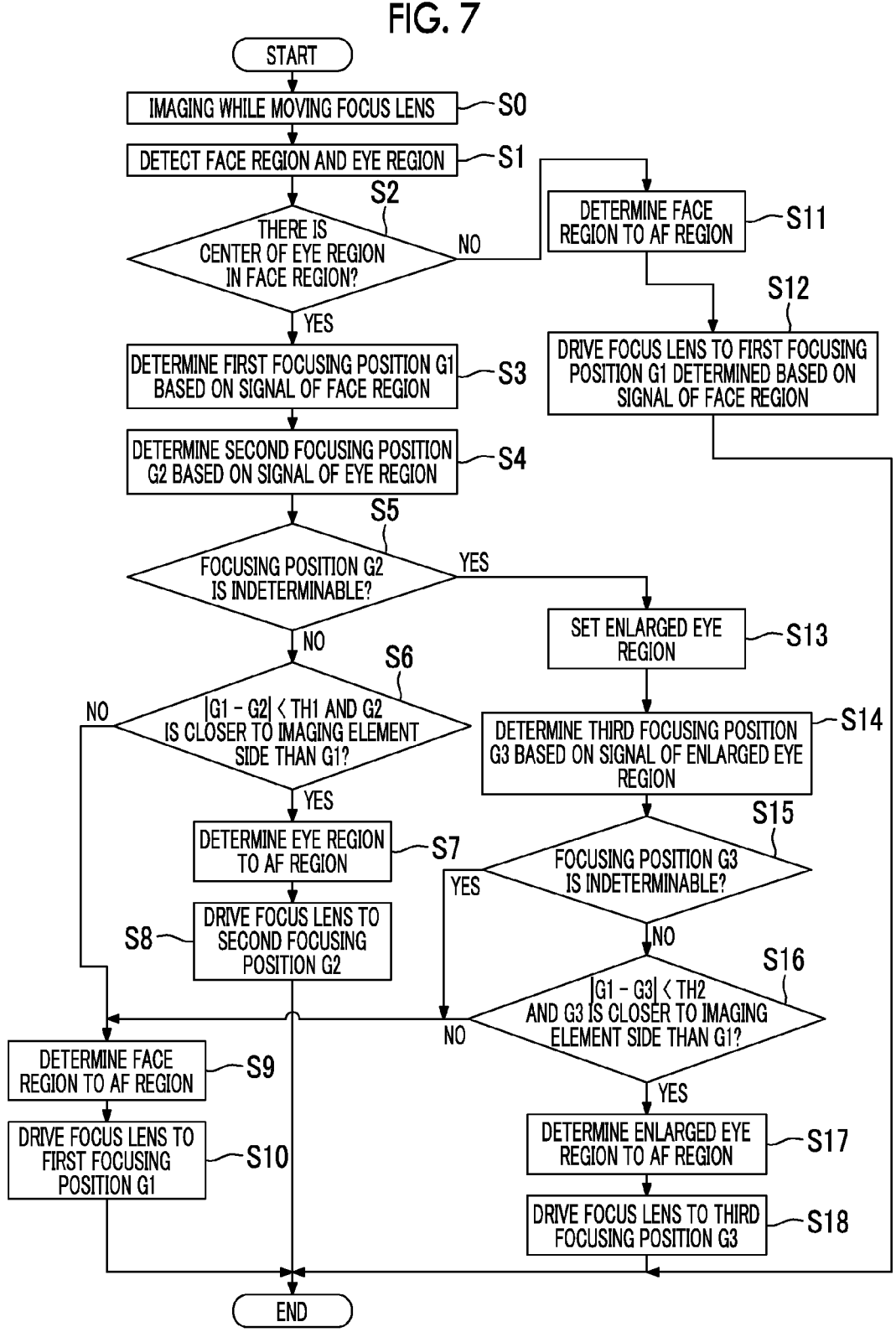
FIG. 7 is a flowchart illustrating an AF operation of the digital camera shown in FIG. 1.

FIG. 7 is a flowchart illustrating an AF operation of the digital camera shown in FIG. 1. Processing of FIG. 7 is started when the AF instruction is input to the system control unit 11 by depression of a shutter button of the operating unit 14, or the like.

If the AF instruction is issued, the system control unit 11 causes the imaging element 5 to image the subject while moving the focus lens (Step S0). A captured image signal obtained through first imaging out of respective imaging is set as a captured image signal IA.

If the captured image signal IA is acquired, the face detection unit 31 performs face detection processing on the captured image signal IA and outputs a face detection result (coordinates of a face region). In parallel with the face detection processing, the eye detection unit 32 outputs a result (coordinates of an eye region) of eye detection processing on a captured image signal IB obtained through imaging with the imaging element 5 at a time before the time at which the captured image signal IA is obtained (Step S1).

Next, the AF region determination unit 33 compares the face region (hereinafter, referred to as a face region F) and the eye region (hereinafter, referred to as an eye region E) detected in Step S1, and determines whether or not the center of the eye region E is present in the face region F (Step S2).

In a case where the center of the eye region E is not present in the face region F, in other words, in a case where the center of the eye region E is present outside the face region F (Step S2: NO), the AF region determination unit 33 determines the face region F as an AF region (Step S11).

After Step S11, the focusing position determination unit 34 calculates an evaluation value for each position of the focus lens based on a signal of the AF region determined in Step S11 in the captured image signal obtained through respective imaging in Step S0, and determines, as a first focusing position G1, the position of the focus lens where the evaluation value becomes maximum.

If the first focusing position G1 is determined, the system control unit 11 performs control such that the lens drive unit 8 drives the focus lens to the first focusing position G1 (Step S12), and ends the AF operation. The system control unit 11 functions as a drive unit. The drive unit is a functional block which is realized by the focusing control program being executed by the processor included in the system control unit 11. The system control unit 11 which executes the focusing control program and the contrast AF processing unit 20 function as a focusing control device.

In a case where the determination of Step S2 is YES, the focusing position determination unit 34 calculates an evaluation value for each position of the focus lens based on a signal of the face region F detected in Step S1 in the captured image signal obtained through respective imaging in Step S0, and determines the first focusing position G1 of the focus lens where the evaluation value becomes maximum (Step S3).

The focusing position determination unit 34 calculates the evaluation value for each position of the focus lens based on a signal of the eye region E detected in Step S1 in the captured image signal obtained through respective imaging in Step S0, and determines a second focusing position G2 of the focus lens where the evaluation value becomes maximum (Step S4).

Figure 8:
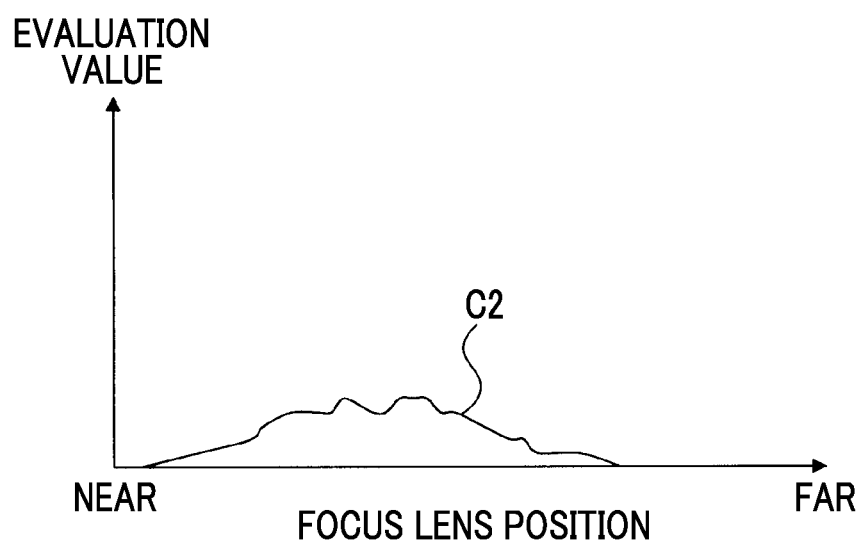
FIG. 8 is a diagram showing an example of an evaluation value curve.

The eye region E is a small region compared to the face region F. For this reason, for the eye region E, an evaluation value curve becomes as illustrated in FIG. 8, and there is a case where the second focusing position G2 is unable to be determined uniquely. For this reason, after Step S4, the AF region determination unit 33 determines whether or not the second focusing position G2 is able to be determined by the processing of Step S4 (Step S5).

In a case where the second focusing position G2 is able to be determined by the processing of Step S4 (Step S5: NO), the AF region determination unit 33 performs comparison of the first focusing position G1 and the second focusing position G2. Specifically, the AF region determination unit 33 determines whether or not the difference between the first focusing position G1 and the second focusing position G2 is less than a first threshold value TH1 and the second focusing position G2 is on the imaging element 5 side from the first focusing position G1 (a distance between the second focusing position G2 and the imaging element 5 is shorter than a distance between the first focusing position G1 and the imaging element 5) (Step S6).

When the determination of Step S6 is YES, the AF region determination unit 33 determines the eye region E to the AF region (Step S7). After Step S7, the system control unit 11 performs control such that the lens drive unit 8 drives the focus lens to the second focusing position G2 (Step S8), and ends the AF operation.

When the determination of Step S6 is NO, the AF region determination unit 33 determines the face region F to the AF region (Step S9). After Step S9, the system control unit 11 performs control such that the lens drive unit 8 drives the focus lens to the first focusing position G1 (Step S10), and ends the AF operation.

If the signal of the eye region E is obtained by imaging an eye included in the face region F, there is no significant difference between the first focusing position G1 based on the signal of the face region F and the second focusing position G2 based on the signal of the eye region E. For this reason, when the difference between the first focusing position G1 and the second focusing position G2 is significant, there is a high possibility that the signal of the eye region E is obtained by imaging a portion (for example, background) different from an eye included in the face region. For this reason, in the determination of Step S6, when the difference between the first focusing position G1 and the second focusing position G2 is equal to or greater than the first threshold value TH1, it is determined that reliability of the eye region E is low, and the AF region determination unit 33 determines the face region F to the AF region.

Even if the difference between the first focusing position G1 and the second focusing position G2 is less than the first threshold value TH1, in a case where the second focusing position G2 determined based on the signal of the eye region E is on the subject side from the first focusing position G1 determined based on the signal of the face region F, if the focus lens is driven to the second focusing position G2, there is a possibility that most of the face region F is out of focus, and there is a possibility that a face is unable to be imaged clearly. In order to avoid such a situation, in the determination of Step S6, only in a case where the difference between the first focusing position G1 and the second focusing position G2 is less than the first threshold value TH1 and the second focusing position G2 is on the imaging element 5 side from the first focusing position G1, the eye region E is determined as the AF region.

When the determination of Step S5 is YES, the AF region determination unit 33 sets an enlarged eye region EZ obtained by enlarging the eye region E to include the eye region E (Step S13). Thereafter, the focusing position determination unit 34 calculates an evaluation value for each position of the focus lens based on a signal of the enlarged eye region EZ set in Step S13 in the captured image signal obtained through respective imaging in Step S0, and determines a third focusing position G3 of the focus lens where the evaluation value becomes maximum (Step S14).

The enlarged eye region EZ obtained by enlarging the eye region E increases in the amount of information compared to the eye region E. For this reason, for the enlarged eye region EZ, it is possible to increase a possibility capable of determining a focusing position compared to the eye region E.

Figure 9:
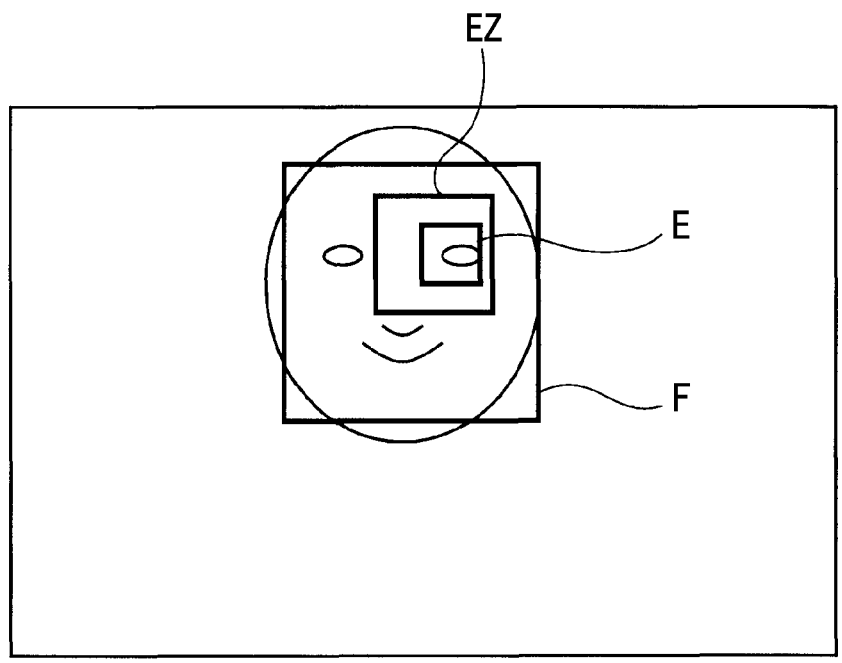
FIG. 9 is a diagram illustrating a face region F, an eye region E, and an enlarged eye region EZ.

FIG. 9 is a diagram illustrating the face region F, the eye region E, and the enlarged eye region EZ.

In the example of FIG. 9, the center coordinates of the enlarged eye region EZ are deviated in a direction to come closer to the center of the face region F including the eye region E than the center coordinates of the eye region E.

The deviation of the center coordinates of the enlarged eye region in a direction to come closer to the center of the face region F than the center coordinates of the eye region E includes a state in which, when a vector with the center coordinates of the eye region E as a start point and the center coordinates of the face region F as an end point is decomposed into an X-direction component and a Y-direction component, the center coordinates of the enlarged eye region EZ are at a position deviated from the center coordinates of the eye region E by a predetermined amount in a direction in which the X-direction component vector is directed, a state in which the center coordinates of the enlarged eye region EZ are at a position deviated from the center coordinates of the eye region E by a predetermined amount in a direction in which the Y-direction component vector is directed, and a state in which the center coordinates of the enlarged eye region are at a position deviated from the center coordinates of the eye region E by a predetermined amount in each of a direction in which the X-direction component vector is directed and a direction in which the Y-direction component vector is directed.

The enlarged eye region EZ is set as in FIG. 9, whereby it is possible to reduce a possibility that the enlarged eye region EZ is outside the face region F. The enlarged eye region EZ is not outside the face region F, whereby, even in a case where a focusing position is determined based on the signal of the enlarged eye region EZ and the focus lens is driven to the focusing position, it is possible to increase focusing accuracy while preventing a portion other than a face from being brought into focus.

Figure 10:
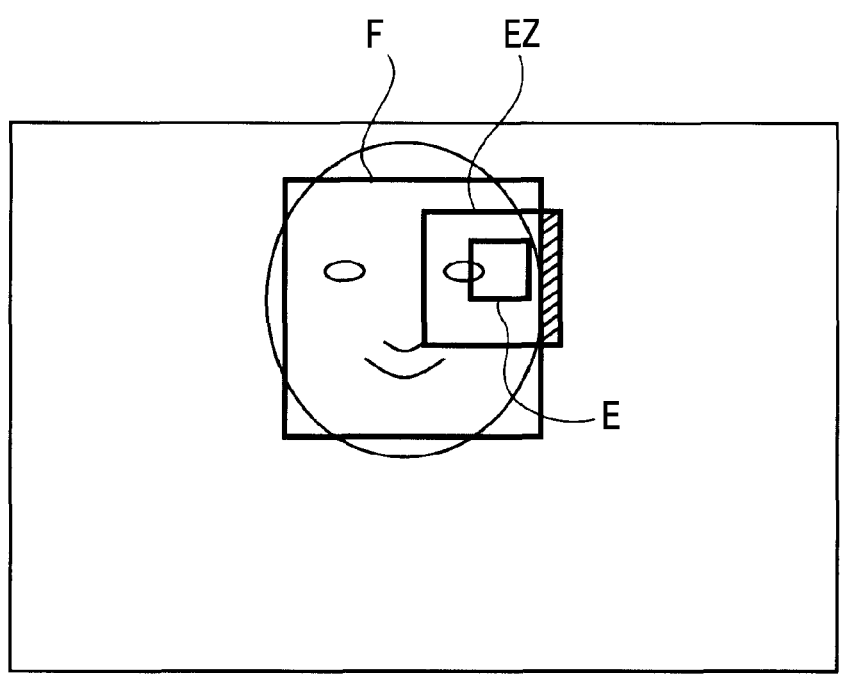
FIG. 10 is a diagram showing a modification example of setting of the enlarged eye region EZ.

Even if the center coordinates of the enlarged eye region EZ are deviated in a direction to come closer to the center of the face region F including the eye region E than the center coordinates of the eye region E, for example, as shown in FIG. 10, there is a case where a part of the enlarged eye region EZ is outside the face region F.

In such a case, it is preferable that the AF region determination unit 33 sets the enlarged eye region EZ excluding a portion (in FIG. 10, a hatched region) in the enlarged eye region EZ outside the face region F. With this, even in a case where a focusing position is determined based on the signal of the enlarged eye region EZ and the focus lens is driven to the focusing position, it is possible to increase focusing accuracy while reliably preventing a portion other than a face from being brought into focus.

The enlarged eye region EZ is a small region compared to the face region F. For this reason, even for the enlarged eye region EZ, there is a possibility that an evaluation value curve becomes as illustrated in FIG. 8, and there is a case where the third focusing position G3 is unable to be determined uniquely. For this reason, after Step S14, the AF region determination unit 33 determines whether or not the third focusing position G3 is able to be determined by the processing of Step S14 (Step S15).

In a case where the third focusing position G3 is able to be determined by the processing of Step S14 (Step S15: NO), the AF region determination unit 33 performs comparison of the first focusing position G1 and the third focusing position G3. Specifically, the AF region determination unit 33 determines whether or not the difference between the first focusing position G1 and the third focusing position G3 is less than a second threshold value TH2 and the third focusing position G3 is on the imaging element 5 side from the first focusing position G1 (Step S16).

When the determination of Step S16 is YES, the AF region determination unit 33 determines the enlarged eye region EZ to the AF region (Step S17). After Step S17, the system control unit 11 performs control such that the lens drive unit 8 drives the focus lens to the third focusing position G3 (Step S18), and ends the AF operation.

When the determination of Step S16 is NO, the AF region determination unit 33 determines the face region F to the AF region (Step S9). After Step S9, the system control unit 11 performs control such that the lens drive unit 8 drives the focus lens to the first focusing position G1 (Step S10), and ends the AF operation.

If the signal of the enlarged eye region EZ is obtained by imaging a range including an eye included in the face region F, there is no significant difference between the first focusing position G1 based on the signal of the face region F and the third focusing position G3 based on the signal of the enlarged eye region EZ.

For this reason, when the difference between the first focusing position G1 and the third focusing position G3 is significant, there is a high possibility that the signal of the enlarged eye region EZ is obtained by imaging a portion (for example, background) different from an eye included in the face region. Accordingly, in the determination of Step S16, when the difference between the first focusing position G1 and the third focusing position G3 is equal to or greater than the second threshold value TH2, it is determined that reliability of the enlarged eye region EZ is low, and the AF region determination unit 33 determines the face region F to the AF region.

Even if the difference between the first focusing position G1 and the third focusing position G3 is less than the second threshold value TH2, in a case where the third focusing position G3 determined based on the signal of the enlarged eye region EZ is on the subject side from the first focusing position G1 determined based on the signal of the face region F, if the focus lens is driven to the third focusing position G3, there is a possibility that most of the face region F is out of focus, and there is a possibility that a face is unable to be imaged clearly.

In order to avoid such a situation, in the determination of Step S16, only in a case where the difference between the first focusing position G1 and the third focusing position G3 is less than the second threshold value TH2 and the third focusing position G3 is on the imaging element 5 side from the first focusing position G1, the enlarged eye region EZ is determined as the AF region.

As described above, the digital camera shown in FIG. 1 can determine which of the eye region and the face region is used as the AF region in driving the focus lens according to the relationship between a face region detected at an arbitrary time and an eye region detected from a captured image signal obtained before the arbitrary time.

For this reason, even in a case where there is a significant difference between the positions of the face region and the eye region since the subject moves, a probability of erroneous focusing is reduced, thereby realizing a stable AF operation. In a case where the subject does not move, that is, in a case where the center of the eye region is present in the face region, it is possible to drive the focus lens to a focusing position determined based on a signal of a region with higher focusing accuracy out of the eye region and the face region. For this reason, in a case where the subject does not move, it is possible to perform a high-accuracy AF operation.

Even in a case where the second focusing position G2 is indeterminable, the enlarged eye region EZ is set and the third focusing position G3 is determined based on the signal of the enlarged eye region EZ. Then, in a case where the third focusing position G3 is able to be determined, since it is possible to drive the focus lens to the third focusing position G3, it is possible to increase a possibility that imaging is performed while bringing the vicinity of an eye into focus.

In a case where it is supposed that focusing accuracy is degraded if the focus lens is driven to the second focusing position G2 and the third focusing position G3 (Step S6: NO, and Step S16: NO), the face region is determined as the AF region. For this reason, in any situations, it is possible to perform imaging while bringing at least the face region into focus, and to secure focusing accuracy.

If the AF instruction is input to the system control unit 11, the display control unit 23 displays a live view image on the display unit 24, and during the AF operation, may display information (for example, a face frame and an eye frame) indicating the face region and the eye region on the display unit 24.

However, information indicating the eye region may be displayed only when the determination of Step S2 is YES. In this way, an eye frame is not displayed in a portion where an eye is absent, and the user does not feel a sense of discomfort.

When the processing of Steps S7, S9, and S11 is performed, the display control unit 23 may highlight a frame indicating a region determined as the AF region and may change the color or brightness of a frame not determined as the AF region. With this, it is possible to allow the user to intuitively recognize a region which is brought into focus.

Next, the configuration of a smartphone as an imaging device will be described.

Figure 11:
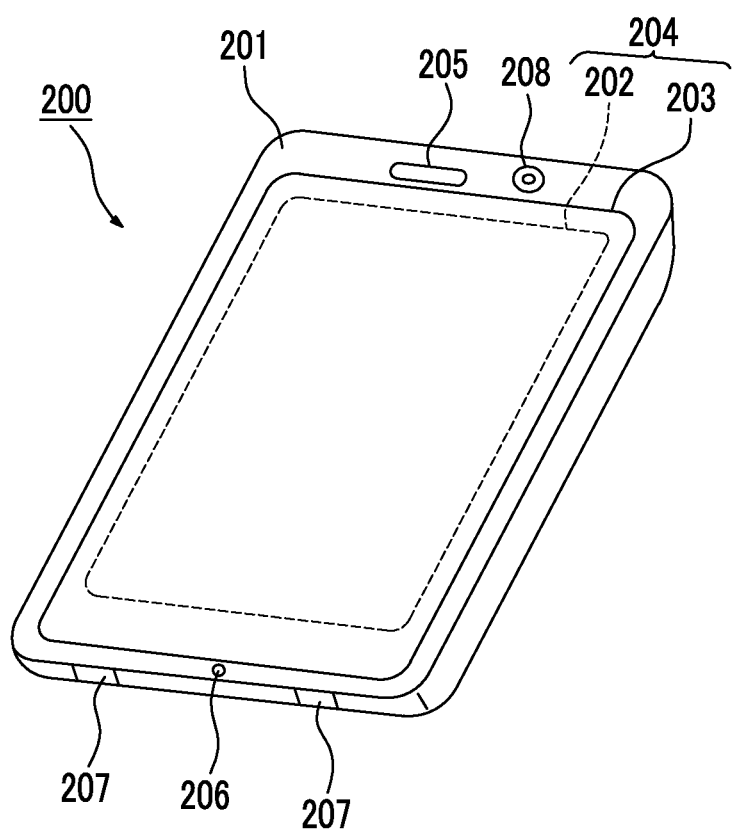
FIG. 11 shows the appearance of a smartphone 200 which is an embodiment of an imaging device of the invention.

FIG. 11 shows the appearance of a smartphone 200 which is an embodiment of an imaging device of the invention. The smartphone 200 shown in FIG. 11 has a flat plate-shaped housing 201, and includes a display input unit 204 in which a display panel 202 as a display unit on one surface of the housing 201 and an operation panel 203 as an input unit are integrated. The housing 201 includes a speaker 205, a microphone 206, an operating unit 207, and a camera unit 208. The configuration of the housing 201 is not limited thereto, and for example, a configuration in which the display unit and the input unit are independent from each other may be employed, or a configuration having a folding structure or a slide mechanism may be employed.

Figure 12:
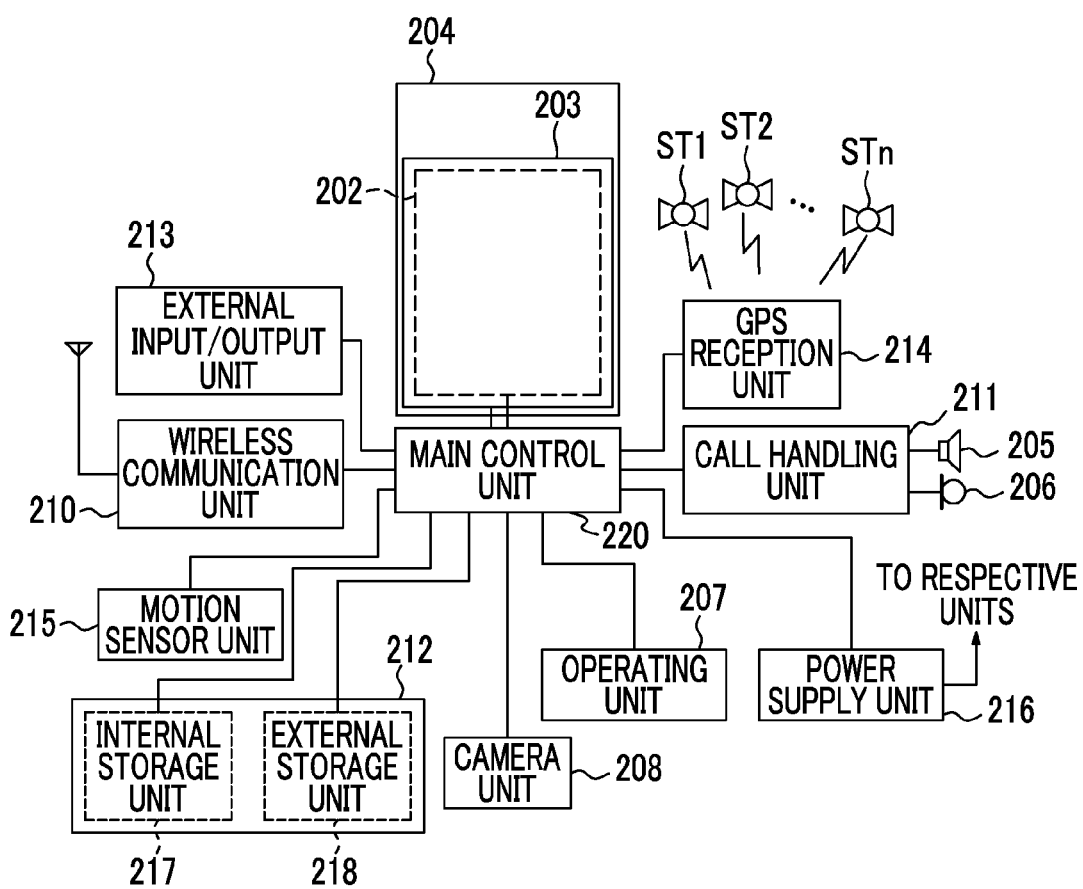
FIG. 12 is an internal block diagram of the smartphone of FIG. 11.

FIG. 12 is a block diagram showing the configuration of the smartphone 200 shown in FIG. 11. As shown in FIG. 12, principal components of the smartphone include a wireless communication unit 210, a display input unit 204, a call handling unit 211, an operating unit 207, a camera unit 208, a storage unit 212, an external input/output unit 213, a global positioning system (GPS) reception unit 214, a motion sensor unit 215, a power supply unit 216, and a main control unit 220. Principal functions of the smartphone 200 include a wireless communication function of performing mobile wireless communication with a base station device (not shown) through a mobile communication network (not shown).

The wireless communication unit 210 performs wireless communication with a base station device in the mobile communication network according to an instruction of the main control unit 220. With the use of the wireless communication, transmission and reception of various kinds of file data, such as music data and image data, and electronic mail data, or reception of Web data, streaming data, or the like is performed.

The display input unit 204 is a so-called touch panel which displays images (still images and moving images) or character information, or the like to visually transfer information to the user and detects a user's operation on the displayed information under the control of the main control unit 220, and includes the display panel 202 and the operation panel 203.

The display panel 202 uses a liquid crystal display (LCD), an organic electro-luminescence display (OELD), or the like as a display device.

The operation panel 203 is a device which is placed such that an image displayed on a display surface of the display panel 202 is visible, and detects one or a plurality of coordinates of an operation with a user's finger or a stylus. If the device is operated with the user's finger or the stylus, a detection signal due to the operation is output to the main control unit 220. Next, the main control unit 220 detects an operation position (coordinates) on the display panel 202 based on the received detection signal.

As shown in FIG. 12, although the display panel 202 and the operation panel 203 of the smartphone 200 illustrated as an embodiment of an imaging device of the invention are integrated to constitute the display input unit 204, the operation panel 203 is arranged to completely cover the display panel 202.

In a case where this arrangement is employed, the operation panel 203 may include a function of detecting a user's operation even in a region outside the display panel 202. In other words, the operation panel 203 may include a detection region (hereinafter, referred to as a display region) for a superimposed portion overlapping the display panel 202 and a detection region (hereinafter, referred to as a non-display region) for an outer edge portion not overlapping the display panel 202 other than the display region.

Although the size of the display region may completely match the size of the display panel 202, it is not always necessary to match both of the size of the display region and the size of the display panel 202. The operation panel 203 may include two sensitive regions including an outer edge portion and an inner portion other than the outer edge portion. The width of the outer edge portion is appropriately designed according to the size of the housing 201 or the like. As a position detection system which is employed in the operation panel 203, a matrix switching system, a resistive film system, a surface acoustic wave system, an infrared system, an electromagnetic induction system, an electrostatic capacitance system, and the like are exemplified, and any system can be employed.

The call handling unit 211 includes the speaker 205 and the microphone 206, converts speech of the user input through the microphone 206 to speech data processable in the main control unit 220 and outputs speech data to the main control unit 220, or decodes speech data received by the wireless communication unit 210 or the external input/output unit 213 and outputs speech from the speaker 205. As shown in FIG. 18, for example, the speaker 205 can be mounted on the same surface as the surface on which the display input unit 204 is provided, and the microphone 206 can be mounted on the side surface of the housing 201.

The operating unit 207 is a hardware key using a key switch or the like, and receives an instruction from the user. For example, as shown in FIG. 11, the operating unit 207 is a push button-type switch which is mounted on the side surface of the housing 201 of the smartphone 200, and is turned on when depressed with a finger or the like and is turned off by restoration force of the panel or the like if the finger is released.

The storage unit 212 stores a control program or control data of the main control unit 220, application software, address data in association with the name, telephone number, and the like of a communication partner, data of transmitted and received electronic mail, Web data downloaded by Web browsing, and downloaded content data, and temporarily stores streaming data or the like. The storage unit 212 is constituted of an internal storage unit 217 embedded in the smartphone and an external storage unit 218 having a slot for a detachable external memory. The internal storage unit 217 and the external storage unit 218 constituting the storage unit 212 are realized using a memory, such as a flash memory type, a hard disk type, a multimedia card micro type, or a card type, or a storage medium, such as a random access memory (RAM) or a read only memory (ROM).

The external input/output unit 213 plays a role of an interface with all external devices connected to the smartphone 200, and is provided for direct or indirect connection to other external devices by communication or the like (for example, universal serial bus, IEEE1394, or the like), or a network (for example, the Internet, wireless local area network (LAN), Bluetooth (Registered Trademark), radio frequency identification (RFID), infrared communication, ultra wideband (UWB) (Registered Trademark), ZigBee (Registered Trademark), or the like).

The external devices connected to the smartphone 200 are, for example, a wired or wireless headset, a wired or wireless external charger, a wired or wireless data port, a memory card connected through a card socket, a subscriber identity module (SIM) card, a user identity module (UIM) card, an external audio-video device connected through an audio-video input/output (I/O) terminal, an external audio-video device connected in a wireless manner, a smartphone connected in a wired or wireless manner, a personal computer connected in a wired or wireless manner, an earphone connected in a wired or wireless manner, and the like. The external input/output unit 213 can transfer data transmitted from the external devices to the respective components in the smartphone 200 or can transmit data in the smartphone 200 to the external devices.

The GPS receiving unit 214 receives GPS signals transmitted from GPS satellites ST1 to STn according to an instruction of the main control unit 220, executes positioning calculation processing based on a plurality of received GPS signals, and detects the position of the smartphone 200 having latitude, longitude, and altitude. When positional information can be acquired from the wireless communication unit 210 or the external input/output unit 213 (for example, a wireless LAN), the GPS receiving unit 214 can detect the position using the positional information.

The motion sensor unit 215 includes, for example, a three-axis acceleration sensor or the like, and detects physical motion of the smartphone 200 according to an instruction of the main control unit 220. The moving direction or acceleration of the smartphone 200 is detected by detecting physical motion of the smartphone 200. The detection result is output to the main control unit 220.

The power supply unit 216 supplies electric power stored in a battery (not shown) to the respective units of the smartphone 200 according to an instruction of the main control unit 220.

The main control unit 220 includes a microprocessor, operates according to the control program or control data stored in the storage unit 212, and integrally controls the respective units of the smartphone 200. The main control unit 220 has a mobile communication control function of controlling respective units of a communication system in order to perform speech communication or data communication through the wireless communication unit 210, and an application processing function.

The application processing function is realized by the main control unit 220 operating according to application software stored in the storage unit 212. The application processing function is, for example, an infrared communication function of controlling the external input/output unit 213 to perform data communication with a device facing the smartphone 200, an electronic mail function of transmitting and receiving electronic mail, a Web browsing function of browsing Web pages, or the like.

The main control unit 220 has an image processing function of displaying video on the display input unit 204, or the like based on image data (still image or moving image data), such as received data or downloaded streaming data. The image processing function refers to a function of the main control unit 220 decoding image data, performing image processing on the decoding result, and displaying an image on the display input unit 204.

The main control unit 220 executes display control on the display panel 202 and operation detection control for detecting a user's operation through the operating unit 207 and the operation panel 203. With the execution of the display control, the main control unit 220 displays an icon for activating application software or a software key, such as a scroll bar, or displays a window for creating electronic mail. The scroll bar refers to a software key for receiving an instruction to move a display portion of an image which is too large to fit into the display area of the display panel 202.

With the execution of the operation detection control, the main control unit 220 detects a user's operation through the operating unit 207, receives an operation on the icon or an input of a character string in an entry column of the window through the operation panel 203, or receives a scroll request of a display image through the scroll bar.

In addition, with the execution of the operation detection control, the main control unit 220 has a touch panel control function of determining whether or not an operation position on the operation panel 203 is the superimposed portion (display region) overlapping the display panel 202 or the outer edge portion (non-display region) not overlapping the display panel 202 other than the display region, and controlling the sensitive region of the operation panel 203 or the display position of the software key.

The main control unit 220 may detect a gesture operation on the operation panel 203 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the above-described operations.

The camera unit 208 includes the configuration other than external memory control unit 21, the recording medium 22, the display control unit 23, the display unit 24, and the operating unit 14 in the digital camera shown in FIG. 1. Captured image data generated by the camera unit 208 can be recorded in the storage unit 212 or can be output through the external input/output unit 213 or the wireless communication unit 210. In the smartphone 200 shown in FIG. 11, although the camera unit 208 is mounted on the same surface as the display input unit 204, the mounting position of the camera unit 208 is not limited thereto, and the camera unit 208 may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one operation input of the operation panel 203. When the GPS receiving unit 214 detects the position, the position may be detected with reference to an image from the camera unit 208. In addition, the optical axis direction of the camera unit 208 of the smartphone 200 can be determined or a current user environment may be determined with reference to an image from the camera unit 208 without using the three-axis acceleration sensor or in combination with the three-axis acceleration sensor. Of course, an image from the camera unit 208 may be used in application software.

In addition, image data of a still image or a moving image may be attached with positional information acquired by the GPS receiving unit 214, speech information (which may be converted to text information through speech-text conversion by the main control unit or the like) acquired by the microphone 206, posture information acquired by the motion sensor unit 215, or the like and can be recorded in the storage unit 212, or may be output through the external input/output unit 213 or the wireless communication unit 210.

Even in the smartphone 200 configured as above, the contrast AF processing unit 20 of FIG. 1 is provided in the camera unit 208, whereby it is possible to perform high-accuracy focusing control.

As described above, the following matters are disclosed in this specification.

Disclosed is a focusing control device comprising a focusing position determination unit which causes an imaging element imaging a subject through a focus lens to image the subject for each position of the focus lens while moving the focus lens movable in an optical axis direction and determines a focusing position of the focus lens based on a captured image signal obtained through the imaging, a face detection unit which performs face detection processing on the captured image signal obtained by imaging the subject with the imaging element, an eye detection unit which performs eye detection processing on the captured image signal obtained by imaging the subject with the imaging element, a specific region determination unit which, based on a face region detected by the face detection unit from a first captured image signal obtained through imaging with the imaging element at an arbitrary time and an eye region detected by the eye detection unit from a second captured image signal obtained through imaging with the imaging element at a time before the arbitrary time, determines a specific region indicating a region to be focused in the captured image signal, and a drive unit which drives the focus lens to a focusing position determined by the focusing position determination unit based on a signal of the specific region determined by the specific region determination unit in the captured image signal.

In the disclosed focusing control device, in a case where a center of the eye region exists outside the face region, the specific region determination unit determines the face region as the specific region.

In the disclosed focusing control device, in a case where a center of the eye region exists inside the face region, the specific region determination unit compares a first focusing position of the focus lens determined by the focusing position determination unit based on a signal of the face region in the captured image signal with a second focusing position of the focus lens determined by the focusing position determination unit based on a signal of the eye region in the captured image signal to determine either of the face region or the eye region as the specific region.

In the disclosed focusing control device, in a case where the difference between the first focusing position and the second focusing position is less than a first threshold value and the second focusing position is on the imaging element side from the first focusing position, the specific region determination unit determines the eye region as the specific region.

In the disclosed focusing control device, in a case where the second focusing position is indeterminable, the specific region determination unit compares a third focusing position of the focus lens determined by the focusing position determination unit based on a signal of an enlarged eye region obtained by enlarging the eye region in the captured image signal with the first focusing position to determine either of the face region or the enlarged eye region as the specific region.

In the disclosed focusing control device, in a case where the difference between the first focusing position and the third focusing position is less than a second threshold value and the third focusing position is on the imaging element side from the first focusing position, the specific region determination unit determines the enlarged eye region as the specific region.

In the disclosed focusing control device, the specific region determination unit deviates the center of the enlarged eye region in a direction to come closer to the center of the face region than the center of the eye region.

In the disclosed focusing control device, the specific region determination unit excludes a portion in the enlarged eye region outside the face region from the enlarged eye region.

Disclosed is an imaging device comprising the focusing control device and the imaging element.

Disclosed is a focusing control method comprising a focusing position determination step of causing an imaging element imaging a subject through a focus lens to image the subject for each position of the focus lens while moving the focus lens movable in an optical axis direction and determining a focusing position of the focus lens based on a captured image signal obtained through the imaging, a face detection step of performing face detection processing on the captured image signal obtained by imaging the subject with the imaging element, an eye detection step of performing eye detection processing on the captured image signal obtained by imaging the subject with the imaging element, a specific region determination step of, based on a face region detected in the face detection step from a first captured image signal obtained through imaging with the imaging element at an arbitrary time and an eye region detected in the eye detection step from a second captured image signal obtained through imaging with the imaging element at a time before the arbitrary time, determining a specific region indicating a region to be focused in the captured image signal, and a drive step of driving the focus lens to a focusing position determined in the focusing position determination step based on a signal of the specific region determined in the specific region determination step in the captured image signal.

In the disclosed focusing control method, in the specific region determination step, in a case where a center of the eye region exists outside the face region, the face region is determined as the specific region.

In the disclosed focusing control method, in the specific region determination step, in a case where a center of the eye region exists inside the face region, a first focusing position of the focus lens determined in the focusing position determination step based on a signal of the face region in the captured image signal is compared with a second focusing position of the focus lens determined in the focusing position determination step based on a signal of the eye region in the captured image signal to determine either of the face region or the eye region as the specific region.

In the disclosed focusing control method, in the specific region determination step, in a case where the difference between the first focusing position and the second focusing position is less than a first threshold value and the second focusing position is on the imaging element side from the first focusing position, the eye region is determined as the specific region.

In the disclosed focusing control method, in the specific region determination step, in a case where the second focusing position is indeterminable, a third focusing position of the focus lens determined in the focusing position determination step based on a signal of an enlarged eye region including the eye region and being greater than the eye region in the captured image signal is compared with the first focusing position to determine either of the face region or the enlarged eye region as the specific region.

In the disclosed focusing control method, in the specific region determination step, in a case where the difference between the first focusing position and the third focusing position is less than a second threshold value and the third focusing position is on the imaging element side from the first focusing position, the enlarged eye region is determined as the specific region.

In the disclosed focusing control method, in the specific region determination step, the center of the enlarged eye region is deviated in a direction to come closer to the center of the face region than the center of the eye region.

In the disclosed focusing control method, in the specific region determination step, a portion in the enlarged eye region outside the face region is excluded from the enlarged eye region.

Disclosed is a focusing control program which causes a computer to execute a focusing position determination step of causing an imaging element imaging a subject through a focus lens to image the subject for each position of the focus lens while moving the focus lens movable in an optical axis direction and determining a focusing position of the focus lens based on a captured image signal obtained through the imaging, a face detection step of performing face detection processing on the captured image signal obtained by imaging the subject with the imaging element, an eye detection step of performing eye detection processing on the captured image signal obtained by imaging the subject with the imaging element, a specific region determination step of, based on a face region detected in the face detection step from a first captured image signal obtained through imaging with the imaging element at an arbitrary time and an eye region detected in the eye detection step from a second captured image signal obtained through imaging with the imaging element at a time before the arbitrary time, determining a specific region indicating a region to be focused in the captured image signal, and a drive step of driving the focus lens to a focusing position determined in the focusing position determination step based on a signal of the specific region determined in the specific region determination step in the captured image signal.

The invention is applied to, in particular, a digital camera or the like, thereby achieving high convenience and effectiveness.

Although the invention has been described above by a specific embodiment, the invention is not limited to the embodiment, and various modifications may be made without departing from the technical spirit of the invention disclosed herein.

This application is based on Japanese Patent Application No. 2014-265823, filed Dec. 26, 2014, the content of which is incorporated herein.

What is claimed is:

1. A focusing control device comprising:
a focusing position determination unit which causes an imaging element imaging a subject through a focus lens to image the subject for each position of the focus lens while moving the focus lens movable in an optical axis direction and determines a focusing position of the focus lens based on a captured image signal obtained through the imaging;
a face detection unit which performs face detection processing on the captured image signal obtained by imaging the subject with the imaging element;
an eye detection unit which performs eye detection processing on the captured image signal obtained by imaging the subject with the imaging element;
a specific region determination unit which, based on a face region detected by the face detection unit from a first captured image signal obtained through imaging with the imaging element at an arbitrary time and an eye region detected by the eye detection unit from a second captured image signal obtained through imaging with the imaging element at a time before the arbitrary time, determines a specific region indicating a region to be focused in the captured image signal;
at least one hardware processor configured to implement:
the focusing position determination unit;
the face detection unit;
the eye detection unit; and
the specific region determination unit; and
a drive unit which drives the focus lens to a focusing position determined by the focusing position determination unit based on a signal of the specific region determined by the specific region determination unit in the captured image signal.

2. The focusing control device according to claim 1, wherein, in a case where a center of the eye region exists outside the face region, the specific region determination unit determines the face region as the specific region.

3. The focusing control device according to claim 1, wherein, in a case where a center of the eye region exists inside the face region, the specific region determination unit compares a first focusing position of the focus lens determined by the focusing position determination unit based on a signal of the face region in the captured image signal with a second focusing position of the focus lens determined by the focusing position determination unit based on a signal of the eye region in the captured image signal to determine either of the face region or the eye region as the specific region.

4. The focusing control device according to claim 3, wherein, in a case where a difference between the first focusing position and the second focusing position is less than a first threshold value and the second focusing position is on the imaging element side from the first focusing position, the specific region determination unit determines the eye region as the specific region.

5. The focusing control device according to claim 3, wherein, in a case where the second focusing position is indeterminable, the specific region determination unit compares a third focusing position of the focus lens determined by the focusing position determination unit based on a signal of an enlarged eye region obtained by enlarging the eye region in the captured image signal with the first focusing position to determine either of the face region or the enlarged eye region as the specific region.

6. The focusing control device according to claim 5, wherein, in a case where a difference between the first focusing position and the third focusing position is less than a second threshold value and the third focusing position is on the imaging element side from the first focusing position, the specific region determination unit determines the enlarged eye region as the specific region.

7. The focusing control device according to claim 5, wherein the specific region determination unit deviates a center of the enlarged eye region in a direction to come closer to a center of the face region than the center of the eye region.

8. The focusing control device according to claim 7, wherein the specific region determination unit excludes a portion in the enlarged eye region outside the face region from the enlarged eye region.

9. An imaging device comprising:
the focusing control device according to claim 1; and
the imaging element.

10. A focusing control method comprising:
a focusing position determination step of causing an imaging element imaging a subject through a focus lens to image the subject for each position of the focus lens while moving the focus lens movable in an optical axis direction and determining a focusing position of the focus lens based on a captured image signal obtained through the imaging;
a face detection step of performing face detection processing on the captured image signal obtained by imaging the subject with the imaging element;
an eye detection step of performing eye detection processing on the captured image signal obtained by imaging the subject with the imaging element;
a specific region determination step of, based on a face region detected in the face detection step from a first captured image signal obtained through imaging with the imaging element at an arbitrary time and an eye region detected in the eye detection step from a second captured image signal obtained through imaging with the imaging element at a time before the arbitrary time, determining a specific region indicating a region to be focused in the captured image signal; and
a drive step of driving the focus lens to a focusing position determined in the focusing position determination step based on a signal of the specific region determined in the specific region determination step in the captured image signal.

11. The focusing control method according to claim 10, wherein, in the specific region determination step, in a case where a center of the eye region exists outside the face region, the face region is determined as the specific region.

12. The focusing control method according to claim 10, wherein, in the specific region determination step, in a case where a center of the eye region exists inside the face region, a first focusing position of the focus lens determined in the focusing position determination step based on a signal of the face region in the captured image signal is compared with a second focusing position of the focus lens determined in the focusing position determination step based on a signal of the eye region in the captured image signal to determine either of the face region or the eye region as the specific region.

13. The focusing control method according to claim 12, wherein, in the specific region determination step, in a case where a difference between the first focusing position and the second focusing position is less than a first threshold value and the second focusing position is on the imaging element side from the first focusing position, the eye region is determined as the specific region.

14. The focusing control method according to claim 12, wherein, in the specific region determination step, in a case where the second focusing position is indeterminable, a third focusing position of the focus lens determined in the focusing position determination step based on a signal of an enlarged eye region including the eye region and being greater than the eye region in the captured image signal is compared with the first focusing position to determine either of the face region or the enlarged eye region as the specific region.

15. The focusing control method according to claim 14, wherein, in the specific region determination step, in a case where a difference between the first focusing position and the third focusing position is less than a second threshold value and the third focusing position is on the imaging element side from the first focusing position, the enlarged eye region is determined as the specific region.

16. The focusing control method according to claim 14, wherein, in the specific region determination step, a center of the enlarged eye region is deviated in a direction to come closer to a center of the face region than the center of the eye region.

17. The focusing control method according to claim 16, wherein, in the specific region determination step, a portion in the enlarged eye region outside the face region is excluded from the enlarged eye region.

18. A non-transitory computer readable medium storing a focusing control program which causes a computer to execute:
a focusing position determination step of causing an imaging element imaging a subject through a focus lens to image the subject for each position of the focus lens while moving the focus lens movable in an optical axis direction and determining a focusing position of the focus lens based on a captured image signal obtained through the imaging;
a face detection step of performing face detection processing on the captured image signal obtained by imaging the subject with the imaging element; an eye detection step of performing eye detection processing on the captured image signal obtained by imaging the subject with the imaging element;
a specific region determination step of, based on a face region detected in the face detection step from a first captured image signal obtained through imaging with the imaging element at an arbitrary time and an eye region detected in the eye detection step from a second captured image signal obtained through imaging with the imaging element at a time before the arbitrary time, determining a specific region indicating a region to be focused in the captured image signal; and
a drive step of driving the focus lens to a focusing position determined in the focusing position determination step based on a signal of the specific region determined in the specific region determination step in the captured image signal.

* * * * *